United States Patent
Hasegawa

(10) Patent No.: US 10,027,519 B2
(45) Date of Patent: Jul. 17, 2018

(54) TRANSMISSION APPARATUS, TRANSMISSION METHOD, RECEPTION APPARATUS, AND RECEPTION METHOD

(71) Applicant: Mitsubishi Electric Corporation, Chiyoda-ku (JP)

(72) Inventor: Fumihiro Hasegawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/506,075

(22) PCT Filed: Aug. 3, 2015

(86) PCT No.: PCT/JP2015/071941
§ 371 (c)(1),
(2) Date: Feb. 23, 2017

(87) PCT Pub. No.: WO2016/031496
PCT Pub. Date: Mar. 3, 2016

(65) Prior Publication Data
US 2018/0159709 A1 Jun. 7, 2018

(30) Foreign Application Priority Data
Aug. 27, 2014 (JP) .................................. 2014-172536

(51) Int. Cl.
*H04L 27/26* (2006.01)
(52) U.S. Cl.
CPC .............................. *H04L 27/2607* (2013.01)
(58) Field of Classification Search
USPC .................. 375/260, 343; 370/474, 210, 320
See application file for complete search history.

(56) References Cited

U.S. PATENT DOCUMENTS

| 6,618,452 B1* | 9/2003 | Huber | H04L 27/2607 370/512 |
| 7,072,411 B1* | 7/2006 | Dollard | H04L 27/265 370/210 |

(Continued)

FOREIGN PATENT DOCUMENTS

| CN | 105453462 A | 3/2016 |
| WO | 2009/131155 A1 | 10/2009 |
| WO | 2013/031119 A1 | 3/2013 |

OTHER PUBLICATIONS

Combined Office Action and Search Report dated Jan. 17, 2018 in Chinese Patent Application No. 201580046397.0 with English translation and English translation of category of cited documents, citing documents AO therein, 16 pages.

(Continued)

*Primary Examiner* — Eva Puente
(74) *Attorney, Agent, or Firm* — Oblon, McClelland, Maier & Neustadt, L.L.P.

(57) ABSTRACT

A transmission apparatus includes a symbol arrangement unit to receive multiple symbols constituting a block, duplicate a first symbol of a block one block previous to the block, and output a block symbol being the present block with the duplicated duplicate symbol inserted at a first position thereof, a frequency conversion unit to convert the block symbol into a frequency domain signal, a frequency component removal unit to remove one or more frequency components from the frequency domain signal, a time conversion unit to convert, after interpolation on the frequency domain signal with the frequency components removed, the interpolated frequency domain signal into a time domain signal, and a cyclic prefix insertion unit to duplicate, in the time domain signal, a signal from a position based on the first position through an end as a cyclic prefix, and insert the cyclic prefix at a beginning of the time domain signal.

12 Claims, 13 Drawing Sheets

(56) References Cited

U.S. PATENT DOCUMENTS

| | | | |
|---|---|---|---|
| 2004/0071105 A1* | 4/2004 | Maeda | H04L 1/0009 370/320 |
| 2005/0163238 A1* | 7/2005 | Fujii | H04B 1/7083 375/260 |
| 2010/0061224 A1* | 3/2010 | Noh | H04L 27/2607 370/210 |
| 2011/0032973 A1 | 2/2011 | To et al. | |
| 2014/0036934 A1* | 2/2014 | Buckley | H04L 1/007 370/474 |
| 2014/0226586 A1 | 8/2014 | Kimura et al. | |
| 2016/0182268 A1 | 6/2016 | Hasegawa | |

OTHER PUBLICATIONS

Nevio Benvenuto, et al., "Single Carrier Modulation With Nonlinear Frequency Domain Equalization: An Idea Whose Time Has Come—Again," Proceedings of the IEEE, vol. 98, No. 1, Jan. 2010, pp. 69-96.

Fumihiro Hasegawa, et al., "A Novel Out-of-Band Spectrum Suppression Method without Data Loss," The Institute of Electronics, Information and Communication Engineers, IEICE Technical Report RCS2013-133, Aug. 2013 (with English abstract and partial English translation of Introduction) (7 pages).

Fumihiro Hasegawa, et al., "A Novel Out-of-Band Power Suppression Method using a Pseudo-Anchor Symbol for SC-OFDM," Proceedings of the 2014 IEICE General Conference Tsushin 1, Mar. 4, 2014 (with partial English translation) (2 pages).

Takuya Nishizawa, et al., "Proposal of a New DFTs-OFDMA Scheme with Null DC Sub-carrier for IEEE802.11ah," 2012 Nen IEICE Communications Society Conference Koen Ronbunshu, Sep. 2012 (with partial English translation) (2 pages).

Fumihiro Hasegawa, et al., "A Novel Out-of-Band Power Suppression Method with Improved Transmission Rate," 2014 Nen IEICE Communications Society Conference Koen Ronbunshu 1, Sep. 9, 2014, (1 page).

International Search Report dated Oct. 13, 2015 in PCT/JP2015/071941 filed Aug. 3, 2015.

Extended European Search Report mailed Mar. 12, 2018 in corr. European Patent Application No. 15836217.8, dated Aug. 3, 2015 [citing references AO and AX therein] 13 pp.

Hasegawa et al., "Phase-Anchored SC-OFDM", IEEE Wireless Communications Letters, vol. 3, No. 1, Feb. 2014, 4 pgs.

\* cited by examiner

Fig. 11
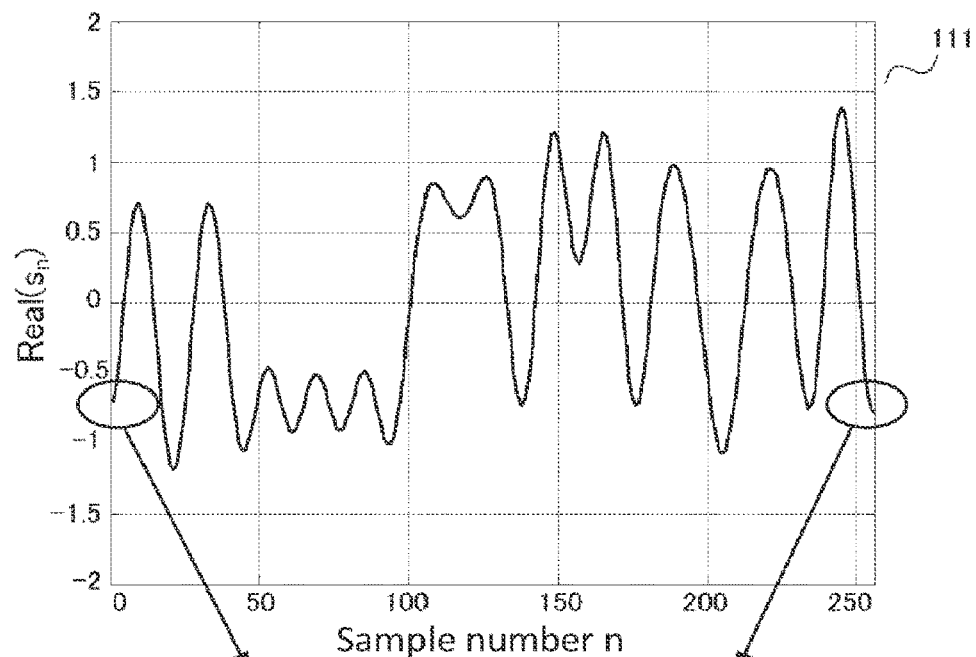
Phase of last sample of block signal is close to phase of top sample of block
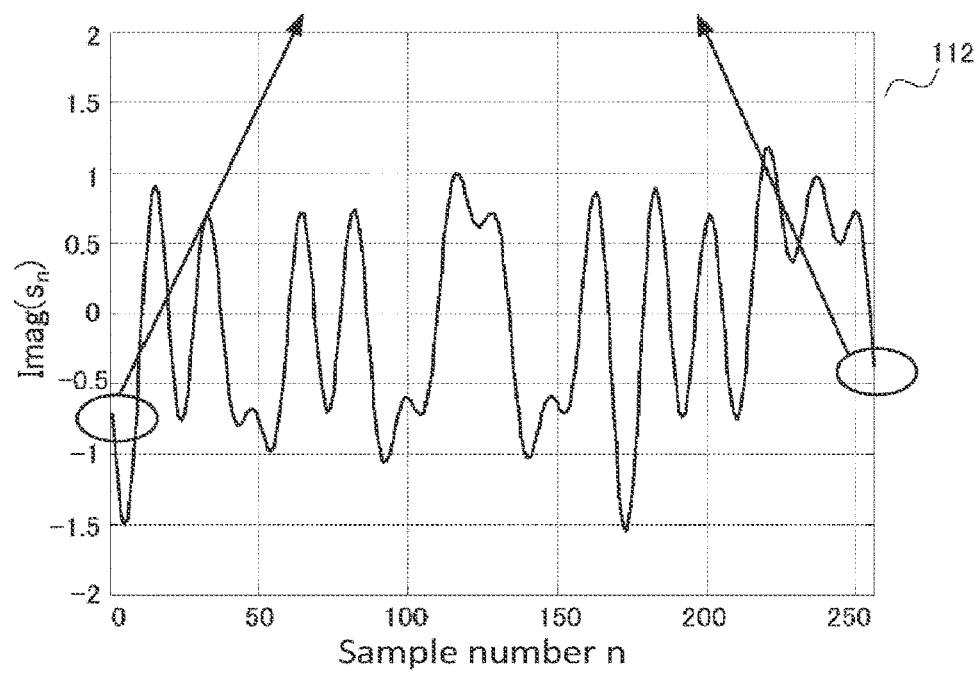

TRANSMISSION APPARATUS, TRANSMISSION METHOD, RECEPTION APPARATUS, AND RECEPTION METHOD

TECHNICAL FIELD

The present invention relates to a transmission apparatus and a reception apparatus employing a single carrier block transmission system.

BACKGROUND ART

In a digital communication system, due to multipath fading caused by transmission signals reflected by buildings or the like, and Doppler fluctuations caused by movement of a terminal, frequency selective fading and fluctuations of transmission delay time occur in transmission channels. Under such multipath environments, a received signal is a resultant signal of a transmission signal interfered with signals arrived after delay times have elapsed.

Regarding such transmission channels with frequency selectivity, a single carrier block transmission system has attracted attentions in recent years (for example, refer to Non-patent document 1 below). With the single carrier (hereinafter, referred to as an SC (Single Carrier)) block transmission system, transmission peak power can be reduced more than with an OFDM (Orthogonal Frequency Division Multiplexing) transmission system that is a type of a multi carrier (hereinafter, referred to as an MC (Multiple Carrier)) block transmission system.

In the SC block transmission, countermeasures against the multipath fading are taken such as a cyclic prefix (hereinafter, referred to as CP (Cyclic Prefix)) insertion that duplicates a rear part of a time domain signal and add it to the beginning of the signal, and a ZP (zero padding) that inserts zeros at the beginning or end part of data. In such a way, in the SC block transmission, transmission peak power can be suppressed while influence of the multipath fading being reduced.

In a general communication system, a spectrum mask indicating the upper limit of spectra outside of an allocated frequency band is determined. In such a communication system, the out-of-band spectra need to be reduced so as to satisfy the spectrum mask. The out-of-band spectra need to be reduced also because they interfere with adjacent channels. However, in the SC block transmission, the out-of-band spectra are generated due to phase discontinuity between SC blocks.

Non-patent document 2 discloses a technique of reducing the out-of-band spectra in which a fixed symbol is inserted in each SC block to maintain continuity of phases between blocks.

PRIOR ART DOCUMENTS

Non-Patent Documents

Non-patent document 1: N. Benvenuto, R. Dinis, D. Falconer and S. Tomasin, "Single Carrier Modulation With Nonlinear Frequency Domain Equalization: An Idea Whose Time Has Come-Again", Proceeding of the IEEE, vol. 98, no. 1, January 2010, pp. 69-96.

Non-patent document 2: Fumihiro Hasegawa, "A Novel Out-of-Band Spectrum Suppression Method without Data Loss", Technical Report of the Institute of Electronics, Information and Communication Engineers, Vol. 113, No. 194, 2013 Aug. 22, P. 57-62, RCS2013-133.

SUMMARY OF INVENTION

Technical Problem

However, Non-patent document 2 has a problem that a data symbol with a fixed symbol inserted is not able to transmit data, leading to reduction of frequency utilization efficiency.

The present invention is made to solve such problems as mentioned above, and aims to obtain, in the SC block transmission, a transmission apparatus that improves frequency utilization efficiency while reducing the out-of-band spectra.

Solution to Problem

There are provided a symbol arranger to receive N−1 symbols constituting a block, duplicate a first symbol of a block one block previous to the block, and output a block symbol being the block at present with the duplicated duplicate symbol inserted at a first position thereof, a frequency converter to convert the block symbol into a frequency domain signal including N frequency components, a frequency component remover to remove one or more frequency components from the frequency domain signal, and output up to N−1 frequency components, a time converter to convert, after performing interpolation on the frequency domain signal with the one or more frequency components removed, the interpolated frequency domain signal into a time domain signal, and a cyclic prefix inserter to duplicate, in the time domain signal, a signal from a position on a basis of the first position through an end as a cyclic prefix, and insert the cyclic prefix at a beginning of the time domain signal.

Advantageous Effects of Invention

According to the invention, in an SC block transmission, out-of-band spectra can be reduced, and frequency utilization efficiency can also be improved.

BRIEF DESCRIPTION OF DRAWINGS

FIG. 11 is a set of graphs showing phases and amplitudes of a signal sn of one block outputted from an IDFT unit according to Embodiment 1.

DESCRIPTION OF EMBODIMENTS

Embodiments of a transmission apparatus and a reception apparatus according to the invention are explained in detail below referring to diagrams. Note that the invention is not limited by the embodiments.

Embodiment 1

Figure 1:
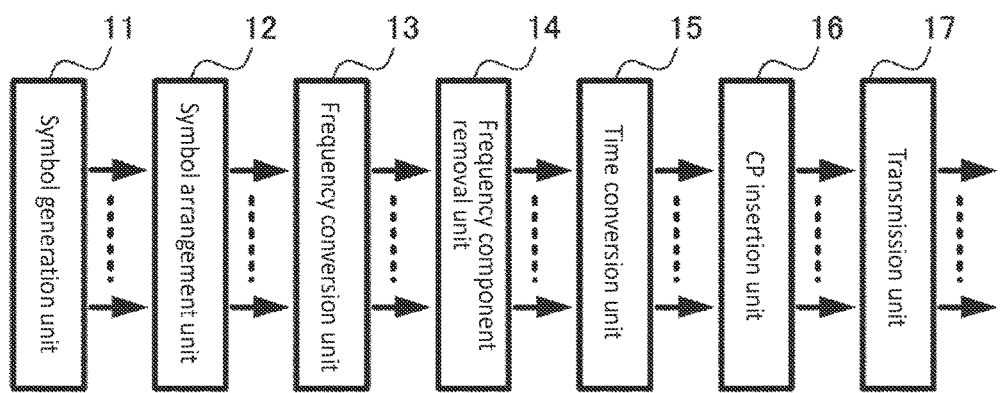
FIG. 1 is a block diagram showing a configuration of a transmission apparatus according to Embodiment 1.

A transmission apparatus is explained in the present embodiment. FIG. 1 is a block diagram showing a configuration of a transmission apparatus 10 according to Embodiment 1. The transmission apparatus 10 includes a symbol generation unit 11, a symbol arrangement unit 12, a frequency conversion unit 13, a frequency component removal unit 14, a time conversion unit 15, a CP insertion unit 16, and a transmission unit 17.

First, an outline of processing of each unit is explained. The symbol generation unit 11 generates symbols, and outputs the symbols as data of a block to the symbol arrangement unit 12. A symbol is, for example, a PSK (Phase Shift Keying) symbol, or a QAM (Quadrature Amplitude Modulation) symbol. A block includes several tens to several thousands of symbols. The symbol arrangement unit 12 duplicates the first symbol of a block one block previous to the block, and outputs a block symbol being the block at present with the duplicated symbol inserted at a first position thereof to the frequency conversion unit 13. The first position is explained later.

The frequency conversion unit 13 converts the inputted block symbol into a frequency domain signal, which is outputted to the frequency component removal unit 14. The frequency component removal unit 14 removes one or more frequency components and outputs the signal to the time conversion unit 15. The time conversion unit 15 converts, after performing interpolation on the inputted frequency domain signal, the frequency domain signal into a time domain signal, which is outputted to the CP insertion unit 16. The CP insertion unit 16 inserts a CP in the time domain signal, which is outputted to the transmission unit 17. The transmission unit 17 outputs the signal with the CP as an SC block signal to a reception apparatus.

Figure 2:
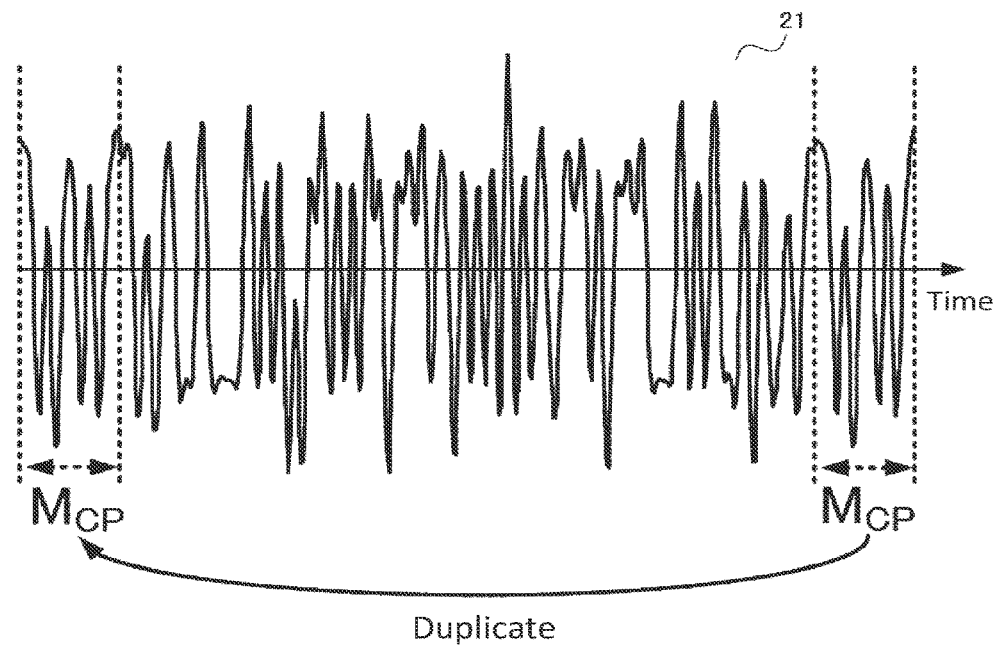
FIG. 2 is a graph showing an example of CP insertion according to Embodiment 1.

Next, insertion of a CP is explained. FIG. 2 is a graph showing an example of a time domain signal 21 with a CP inserted according to Embodiment 1. A horizontal axis shows time and a vertical axis shows signal values. FIG. 2 shows that an area Mcp that is a part of the time domain signal 21 through its end is duplicated as a CP and inserted at the beginning of the time domain signal 21. The CP insertion unit 16 inserts a CP in an inputted time domain signal and outputs the signal to the transmission unit 17.

Figure 3:
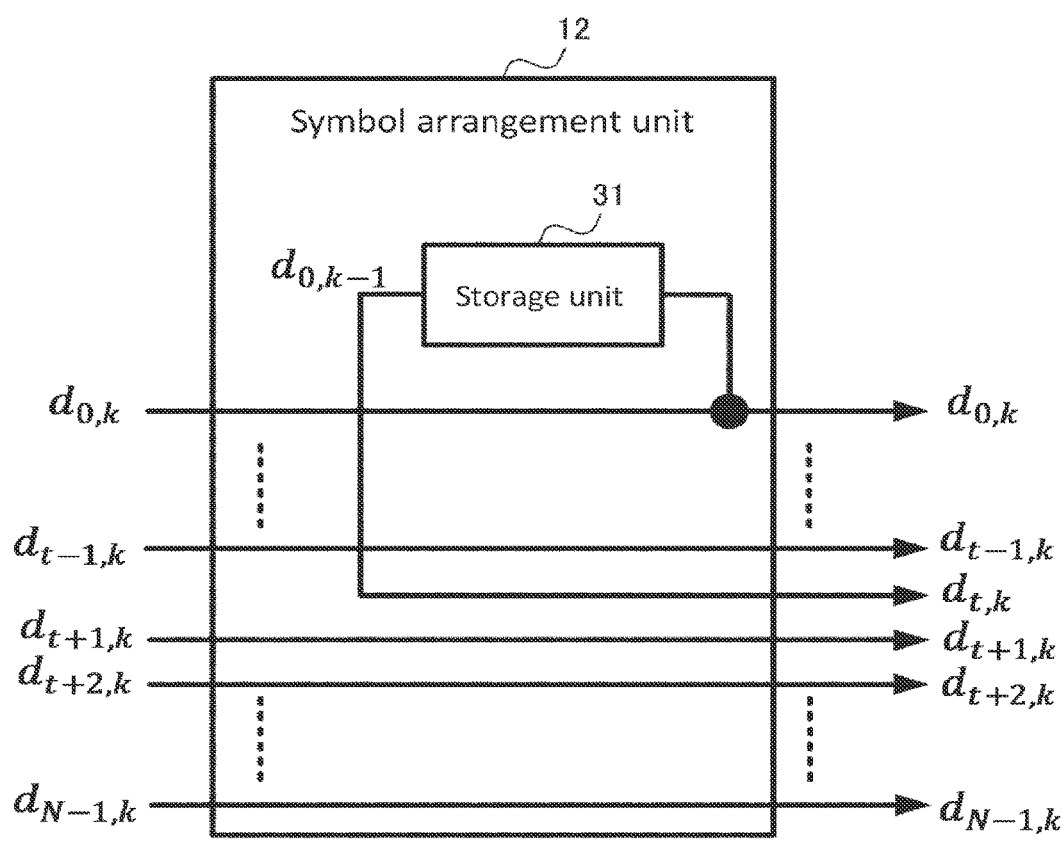
FIG. 3 is a diagram showing relationships between inputs and outputs in a symbol arrangement unit according to Embodiment 1.

Next, details of the symbol arrangement unit 12, the frequency conversion unit 13, the frequency component removal unit 14, and the time conversion unit 15 are explained. First, the symbol arrangement unit 12 is explained. FIG. 3 is a diagram showing relationships between inputs and outputs in the symbol arrangement unit 12 according to Embodiment 1. The symbols outputted from the symbol generation unit 11 are inputted to the symbol arrangement unit 12. The symbol arrangement unit 12 is provided with a storage unit 31 that stores symbols.

In FIG. 3, $d_{j,k}$ indicates a j-th symbol of a k-th block. When N-1 symbols of the k-th block $d_{0,k}, \ldots, d_{t-1,k}, d_{t+1,k}, \ldots, d_{N-1,k}$ are inputted from the symbol generation unit 11, the symbol arrangement unit 12 duplicates the first symbol $d_{0,k}$ of the block and stores it in the storage unit 31. The symbol arrangement unit 12 extracts a symbol $d_{0,k-1}$ of a previous block, or a (k−1)th block, from the storage unit 31, and inserts the symbol $d_{0,k-1}$ as a symbol $d_{t,k}$, a t-th symbol of the k-th block, or a current block. A symbol number t indicates a symbol at the top of an area to be duplicated at a time of CP insertion, or a symbol most influential on the top of the area to be duplicated at the time of the CP insertion. The most influential symbol is described later. The symbol number t indicates the first position where a duplicate symbol is inserted.

The symbol arrangement unit 12 outputs a block symbol including N symbols $d_{0,k}, \ldots, d_{t,k}, \ldots, d_{N-1,k}$ to the frequency conversion unit 13. Note that, in an initial operation, N symbols are inputted from the symbol generation unit 11 to the symbol arrangement unit 12.

Figure 4:
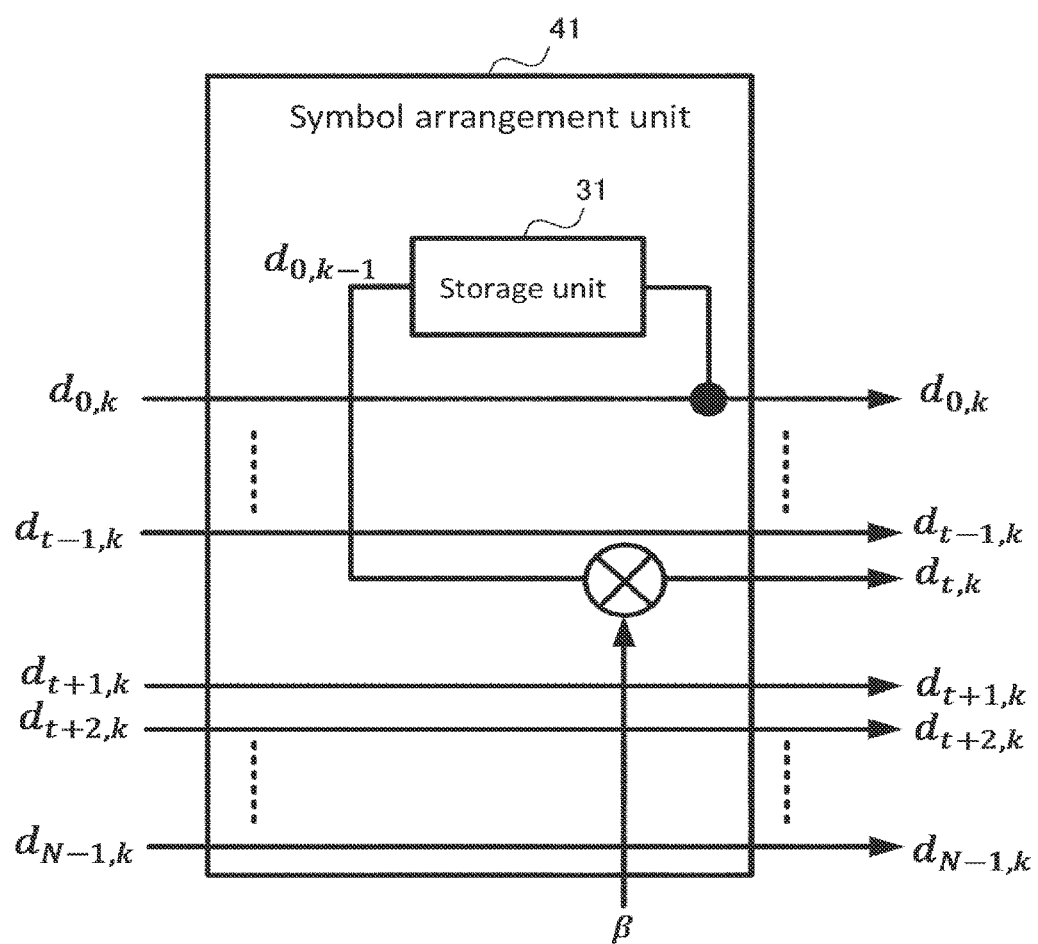
FIG. 4 is a diagram showing relationships between inputs and outputs in a symbol arrangement unit according to Embodiment 1.

The symbol arrangement unit 12 may add phase rotation or amplitude adjustment to the symbol extracted from the storage unit 31. A symbol arrangement unit 41 in this case is shown in FIG. 4. FIG. 4 is a diagram showing relationships between inputs and outputs in the symbol arrangement unit 41 according to Embodiment 1. The symbol arrangement unit 41, after adding a phase rotation β or an amplitude adjustment β to the symbol $d_{0,k-1}$ extracted from the storage unit 31, outputs the symbol as a t-th symbol $d_{t,k}$ of the current block.

Figure 5:
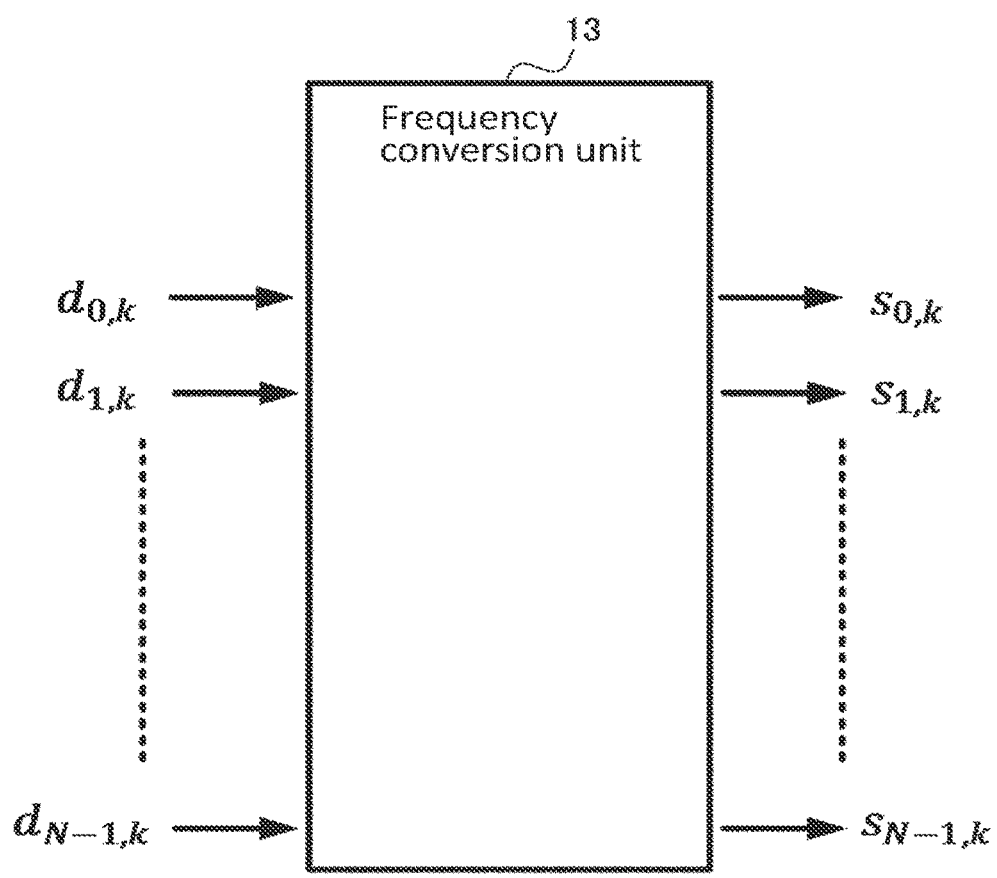
FIG. 5 is a diagram showing relationships between inputs and outputs in a frequency conversion unit according to Embodiment 1.

Next, the frequency conversion unit 13 is explained. FIG. 5 is a diagram showing relationships between inputs and outputs in the frequency conversion unit 13 according to Embodiment 1. From the symbol arrangement unit 12, N symbols $d_{0,k}, \ldots, d_{N-1,k}$ are inputted to the frequency conversion unit 13. The frequency conversion unit 13 performs frequency conversion processing on the N symbols, and outputs a frequency domain signal $s_{0,k}, \ldots, s_{N-1,k}$. The frequency conversion unit 13 performs the frequency conversion processing using, for example, a DFT or an FFT (Fast Fourier Transform). A transmission apparatus to perform SC transmission generally uses DFT processing as a precoder to suppress transmission peak power.

Figure 6:
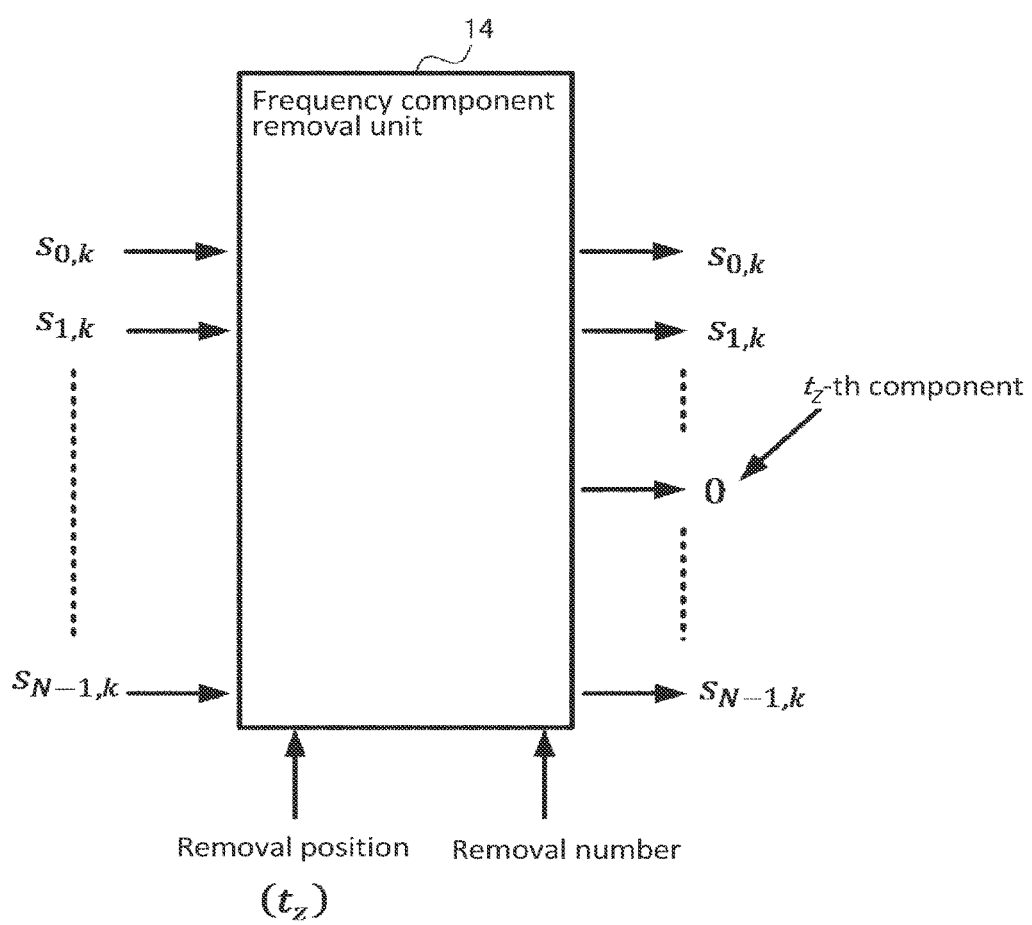
FIG. 6 is a diagram showing relationships between inputs and outputs in a frequency component removal unit according to Embodiment 1.

Next, the frequency component removal unit 14 is explained. FIG. 6 is a diagram showing relationships between inputs and outputs in the frequency component removal unit 14 according to Embodiment 1. The frequency domain signal $s_{0,k}, \ldots, s_{N-1,k}$ is inputted from the frequency conversion unit 13 to the frequency component removal unit 14. As external parameters, a removal position and a removal number of frequency components are inputted to frequency component removal unit 14. The frequency component removal unit 14 removes, from the frequency domain signal $s_{0,k}, \ldots, s_{N-1,k}$, one or more frequency components designated at each removal position $t_2$. When removing, any processing may be used; however, in the embodiment, a "0" is set to each frequency component to be removed. Removal of the frequency components at the designated removal positions by the removal unit 14 enables improvement of frequency utilization efficiency. Note that, one frequency component is removed in FIG. 6; however, the frequency component removal unit 14 may remove multiple frequency components.

Figure 7:
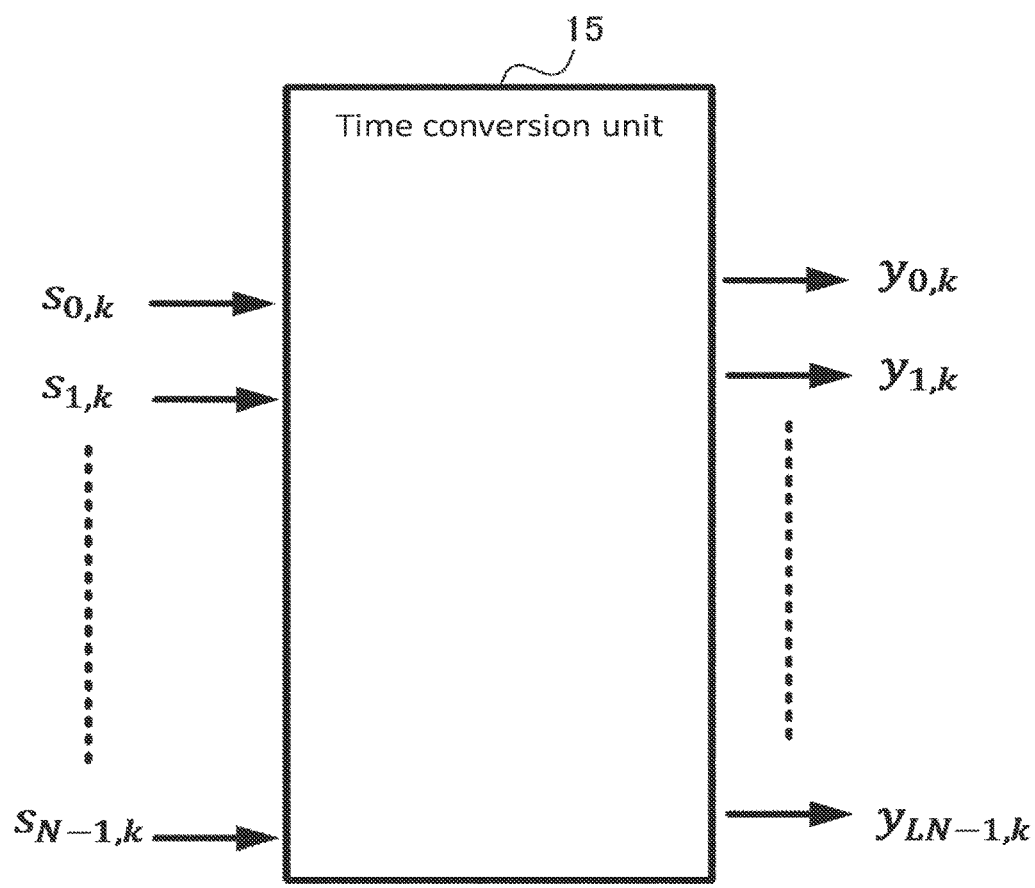
FIG. 7 is a diagram showing relationships between inputs and outputs in a time conversion unit according to Embodiment 1.

Next, the time conversion unit 15 is explained. FIG. 7 is a diagram showing relationships between inputs and outputs in the time conversion unit 15. The frequency domain signal with one or more frequency components removed is inputted from the frequency component removal unit 14 to the time conversion unit 15. The time conversion unit 15, after performing interpolation on the inputted frequency domain signal, converts it into a time domain signal. Any method can be used for the interpolation and the time domain conversion. For example, zero insertion in the frequency domain may be used as the interpolation. The time conversion unit 15 performs the time domain conversion using, for example, an IDFT (Inverse Discrete Fourier Transform) or an IFFT (Inverse Fast Fourier Transform).

Figure 8:
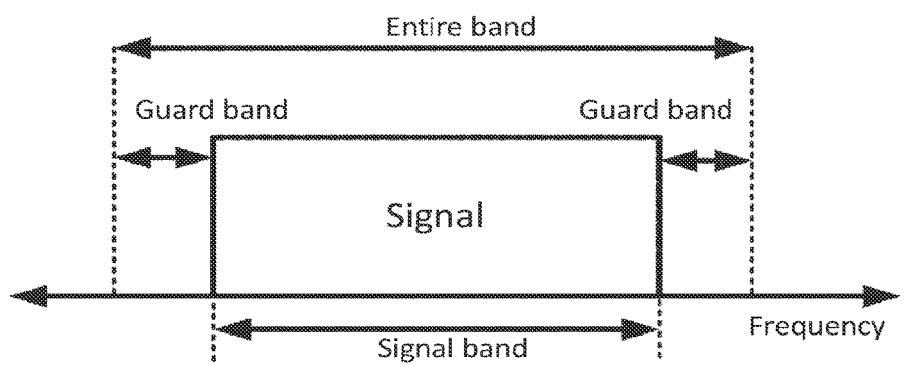
FIG. 8 is a diagram showing a relationship between guard bands and a signal band according to Embodiment 1.

The time conversion unit 15 may insert guard bands in the frequency domain. FIG. 8 is a diagram showing a relationship between guard bands and a signal band. A horizontal axis in FIG. 8 indicates frequencies. A guard band is, of an entire allocated band, a band arranged on a side of a signal band used for data transmission. The guard band is arranged so that signals leaking from other apparatuses that use adjacent frequencies do not interfere with the signal.

The time conversion unit 15 performs oversampling such as zero insertion on the frequency domain signal subjected to the guard band insertion. Specifically, the oversampling is performed using, for example, signal interpolation formulae described in "B. Porat, 'A Course in Digital Signal Processing', John Wiley and Sons Inc., 1997" (hereinafter, referred to as a Porat document). The oversampling is processing to increase a sampling rate, that is to say, to narrow a sampling interval.

The time conversion unit 15 performs an oversampling on an inputted frequency domain signal in such a way that the number of sampling points per component is L. In other words, the oversampling is performed in such a way that a sampling rate is L times the inputted frequency components. The sampling rate is a value indicating how many times larger the number of output samples after the oversampling is than the number of inputted frequency components. When the number of inputted samples is N the number of output samples is LN. Note that, any method may be used for the oversampling. The time conversion unit 15, after performing the oversampling, converts the frequency domain signal into a time domain signal, which is outputted to the CP insertion unit 16.

The time conversion unit 15 may use any interpolation as long as an interpolated point interpolating between the last symbol of the block and the first symbol of the block is set as the last sample of the block. In other words, in the time domain signal subjected to interpolation, any interpolation is acceptable as long as the last sample subjected to the interpolation (a point added by the interpolation) smoothly connects to a value of the first sample of the block.

Figure 9:
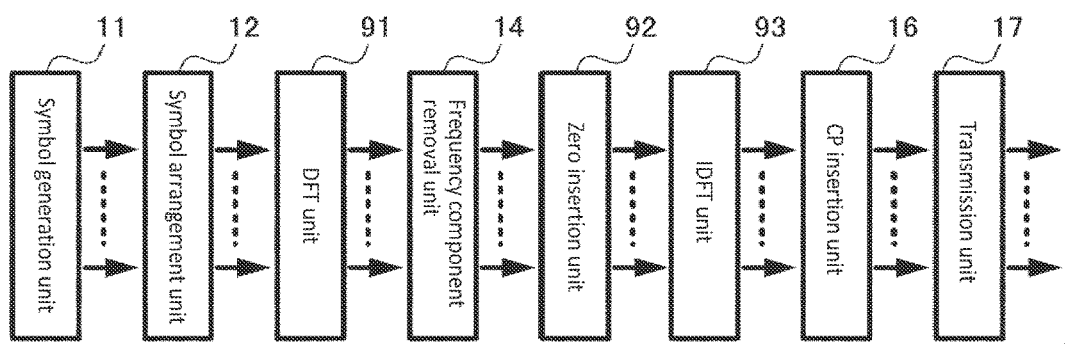
FIG. 9 is a block diagram showing a configuration of a transmission apparatus according to Embodiment 1.

Next, a specific example of the transmission apparatus 10 is explained. FIG. 9 is a block diagram showing a configuration of a transmission apparatus 90 according to Embodiment 1. Different from the transmission apparatus 10 in FIG. 1, a discrete Fourier transform unit (hereinafter, referred to as a DFT unit) 91 is used as the frequency conversion unit 13, and a zero insertion unit 92 and an inverse discrete Fourier transform unit (hereinafter, referred to as an IDFT unit) 93 are used as the time conversion unit 15. In the embodiment, the number of output samples from the IDFT unit 93 is denoted as $N_{ALL}$.

Figure 10:
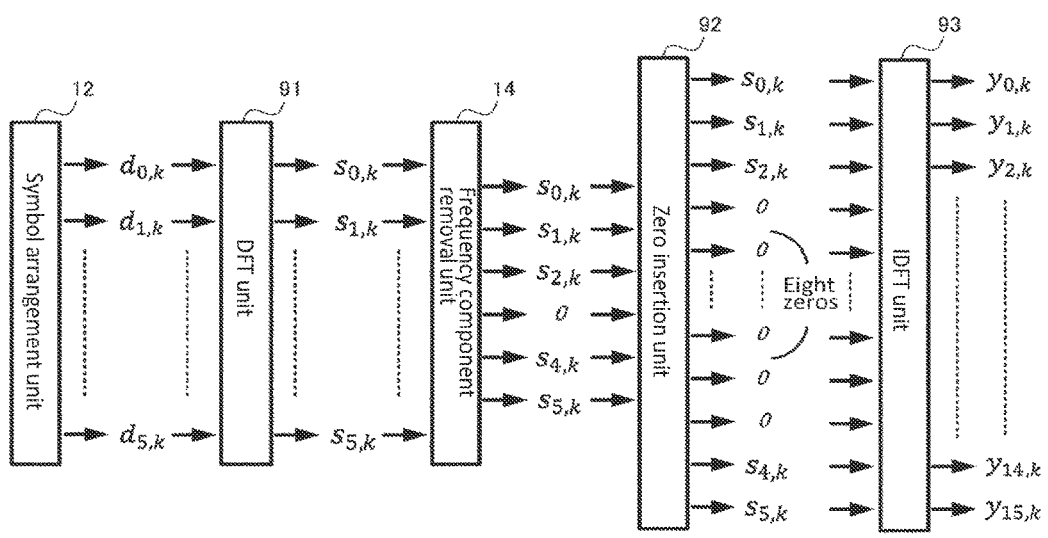
FIG. 10 is a diagram showing relationships between inputs and outputs in the frequency component removal unit and a zero insertion unit according to Embodiment 1.

Next, using specific symbols and signals, removal of frequency components and zero insertion are explained. FIG. 10 is a diagram showing relationships between inputs and outputs from the symbol arrangement unit 12 through the IDFT unit 93 according to Embodiment 1. Assume that the number of output samples from the IDFT unit 93 is $N_{ALL}=8L$, the number of data symbols is $N=6$, and an oversampling rate is $L=2$. In the frequency domain, zeros equivalent to one sample on each side are inserted as a guard band.

Six symbols $d_{0,k}, \ldots, d_{5,k}$ are inputted from the symbol arrangement unit 12 to the DFT unit 91. The DFT unit 91 performs the DFT and outputs a frequency domain signal including six frequency components $s_{0,k}, \ldots, d_{5,k}$ to the frequency component removal unit 14. The frequency component removal unit 14 removes a fourth frequency component from the frequency domain signal $s_{0,k}, \ldots, d_{5,k}$, and outputs the signal with $s_{3,k}=0$. By arranging data of other blocks or control information in the frequency component set as $s_{3,k}=0$, a frequency utilization efficiency can be improved. The order of data outputted from the DFT unit 91 is $s_{3,k}, s_{4,k}, s_{5,k}, s_{0,k}, s_{1,k}$, and $s_{2,k}$. The first data is $s_{3,k}$ and the last data is $s_{2,k}$.

Because the oversampling rate is two times, the zero insertion unit 92 inserts $N_{ALL}/L$ points, or eight zeros, in the signal subjected to the guard band processing. The zero insertion unit 92, after inserting zeros equivalent to one sample on each side between $s_{2,k}$ and $s_{3,k}$ as a guard band, inserts eight zeros for interpolation by oversampling. The zero insertion unit 92 outputs 16 samples to the IDFT unit 93. Both the frequency components outputted from the DFT unit 91 and the zeros inserted by the zero insertion unit 92 are referred to as samples.

The IDFT unit 93 performs IDFT processing and outputs $y_{0,k}, \ldots, y_{15,k}$. The outputs from the IDFT unit 93 are also referred to as samples.

According to the Porat document, if the interpolation by zero insertion is performed in the frequency domain as described above, the last sample $y_{LN-1,k}$ outputted from the IDFT unit 93 has a phase continuously connecting to a phase of the first symbol $d_{0,k}$, or a phase close to the phase of the first symbol $d_{0,k}$. Because the top of the next block with a CP is the CP and the first sample of the CP has a value close to $d_{0,k}$, continuity of phases between blocks can be maintained. Thus, this enables suppression of out-of-band spectra.

Figure 12:
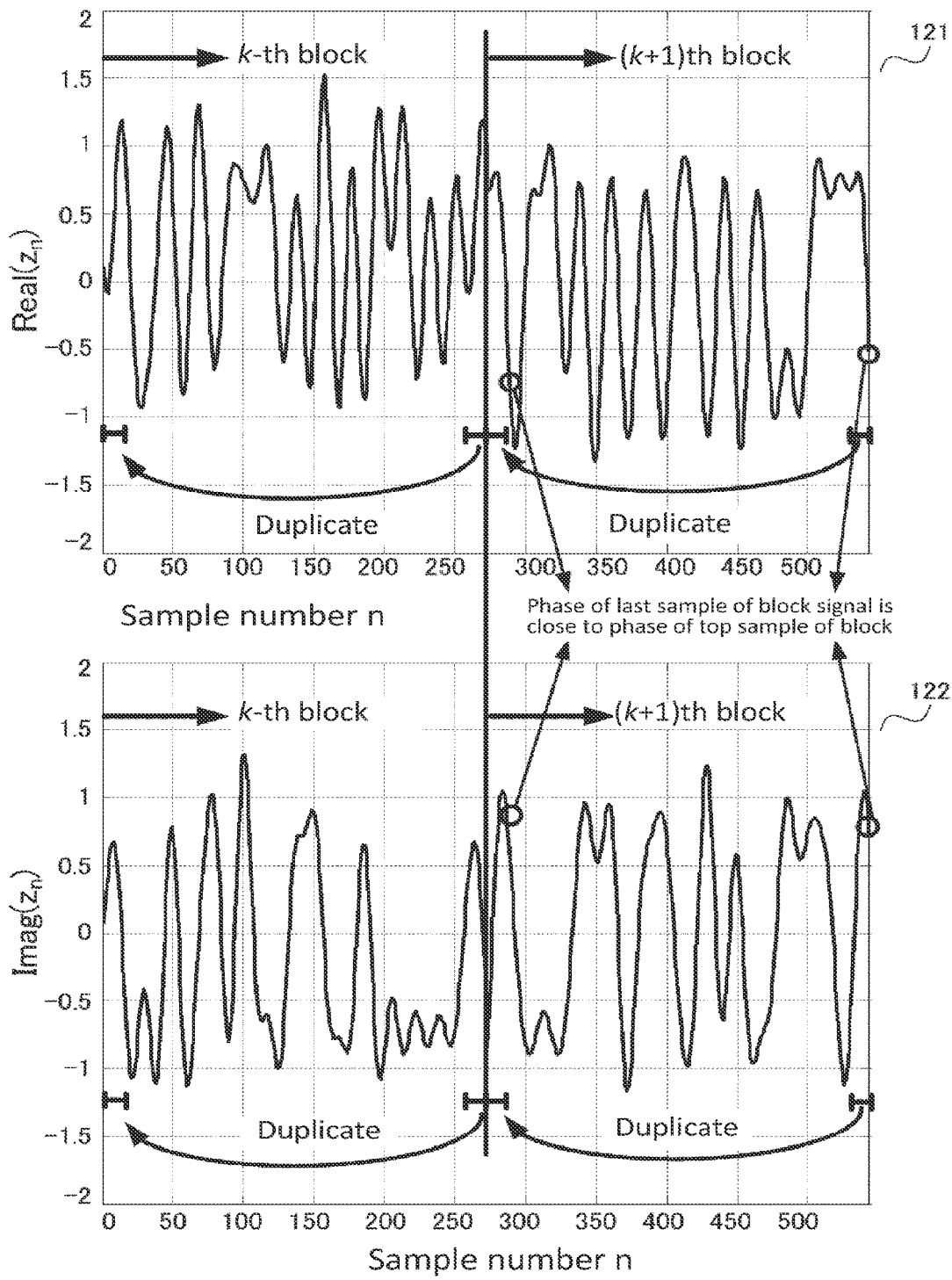
FIG. 12 is a set of graphs showing phases and amplitudes of a transmission signal zn with CPs of two blocks outputted from the IDFT unit according to Embodiment 1.

Next, referring to specific examples in FIG. 11 and FIG. 12, it is shown that interpolation by zero insertion in the frequency domain enables maintenance of continuity of phases between blocks. FIG. 11 is a set of graphs showing phases of samples $s_n$ of one block outputted from the IDFT unit 93 according to Embodiment 1. A graph 111 shows a signal Real ($s_n$) in the real axis. A vertical axis expresses Real($s_n$), and a horizontal axis expresses sample numbers. A graph 112 shows a signal $\text{Imag}(s_n)$ in the imaginary axis. A vertical axis expresses $\text{Real}(s_n)$ or $\text{Imag}(s_n)$, and a horizontal axis expresses the sample numbers. The graph 111 shows that a phase of the last sample of a block of the signal $\text{Real}(s_n)$ is close to a phase of the first sample of the block. The graph 112 also shows that a phase of the last sample of a block of the signal $\text{Imag}(s_n)$ is close to a phase of the first sample of the block.

FIG. 12 is a set of graphs showing phases of a transmission signal $z_n$ with CPs of two blocks outputted form the IDFT unit 93 according to Embodiment 1. The two blocks mean the k-th block and the (k+1)th block. A graph 121 shows a signal real $(Z_n)$ in the real axis. A vertical axis shows $\text{Real}(s_n)$, and a horizontal axis shows sample numbers. A graph 122 shows a signal $\text{imag}(Z_n)$ in the imaginary axis. A vertical axis shows $\text{Imag}(s_n)$, and a horizontal axis shows sample numbers. It is shown that a phase of the last sample of each block is close to a phase of the first symbol, or the symbol just after the CP, of each block. Because the first symbol of the previous block is set to the top of a CP by the symbol arrangement unit 12, phases between blocks continue even in a case of a transmission signal with CPs.

Next, selection of the top position of a CP is explained. A CP length, or the length of a CP, is determined by the number of multipaths in transmission channels or the like. Assume that the symbol arrangement unit 12 and the CP insertion unit 16 hold the CP length beforehand. Assume that the symbol arrangement unit 12 also holds a sampling rate beforehand.

Figure 13:
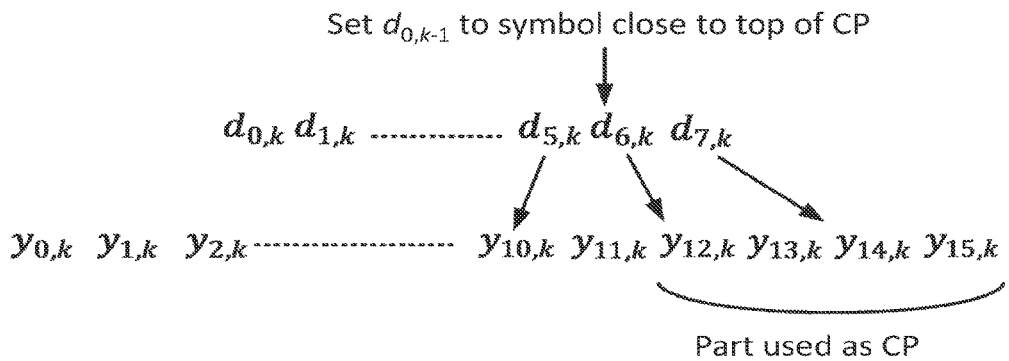
FIG. 13 is a diagram showing an example of a signal outputted from the IDFT unit according to Embodiment 1.

FIG. 13 is a diagram showing an example of a signal outputted form the IDFT unit 93 according to Embodiment 1. Symbols $d_{0,k}, \ldots, d_{7,k}$ are outputted from the symbol arrangement unit 12. Samples $y_{0,k}, \ldots, y_{15,k}$ are outputted from the IDFT unit 93. An arrow from the symbol $d_{5,k}$ to the sample $y_{10,k}$ indicates that a phase of the sample $y_{10,k}$ is determined by the symbol $d_{5,k}$. An arrow from the symbol $d_{6,k}$ to the sample $y_{12,k}$, and an arrow from the symbol $d_{7,k}$ to the sample $y_{14,k}$ have a similar meaning.

For example, in a case where the number of samples used for a CP is $M_{CP}=4$, the CP insertion unit 16 uses the last four samples outputted from the IDFT unit 93 as the CP. In a case where the number of symbols outputted from the symbol arrangement unit 12 is N=8 and two times oversampling is applied, the number of output samples from the IDFT unit 93 is $N_{ALL}=2\times8=16$. A phase of the sample $y_{12,k}$ used as the top of the CP is determined by the symbol $d_{6,k}$. Thus, if the symbol arrangement unit 12 sets the symbol $d_{0,k-1}$ to the symbol $d_{6,k}$, continuity between a phase of the k-th block with the CP and a phase of the (k-1)th block is maintained. In a case where the number $N_{ALL}$ of output samples is L times (L is an integer of one or larger) the number N of symbols, a sample $y_{m,k}$ used as the top of a CP is determined by a symbol $d_{m/L,k}$. A position of the symbol $d_{m/L,k}$ corresponds to a position of the sample $y_{m,k}$ in a time domain signal.

However, in such a case where guard interval insertion is performed, the number $N_{ALL}$ of output samples from the IDFT unit 93 may not be an integral multiple of the number N of symbols. In this case, the symbol arrangement unit 12 can choose a symbol most influential on a sample corresponding to the top of a CP as a duplicate symbol. For example, if an amount of data is N=56 and four times oversampling is applied, then $N_{ALL}=64\times4=256$. A guard interval size in the frequency domain is 64−56=8.

The symbol arrangement unit 12 can calculate a symbol most influential on a sample corresponding to the top of a CP by satisfying Formula 1.

[Expression 1]

$$\frac{\mu}{(N_{ALL}/L)} = \frac{\chi}{N} \quad \text{(Formula 1)}$$

For example, if N=24 and $N_{ALL}=32 \cdot L$, then $\mu=4$ and $\chi=3$. In a case where $0\leq\lambda\leq7$ and $0\leq k\leq N-1$ are assumed and the $(k=\lambda_\chi)$th symbol is set as a duplicate symbol, phases of samples close to the $(\lambda\mu)$th sample outputted from the IDFT unit 93 is close to a phase of the $(\lambda\chi)$th symbol. In a case where the oversampling rate is L times, phases of samples close to the $(L\lambda\mu)$th sample outputted from the IDFT unit 93 is close to the phase of the $(\lambda\chi)$th symbol. The symbol arrangement unit 12 inserts the duplicate symbol at the first symbol of a current block, in other words, the first symbol of a CP of the current block. Note that, a CP length is $(N_{ALL}-\lambda\mu)L$. The position of the symbol most influential on a sample corresponding to the top of the CP is a position obtained on the basis of the position of the sample corresponding to the top of the CP in the time domain signal.

Figure 14:
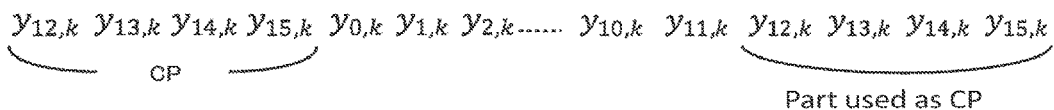
FIG. 14 is a diagram showing an example of a transmission signal with a CP according to Embodiment 1.

A transmission signal with the CP set as described above is shown in FIG. 14. FIG. 14 is a diagram showing an example of a transmission signal with a CP according to Embodiment 1. As the CP, $y_{12,k}, \ldots, y_{15,k}$ are set.

Figure 15:
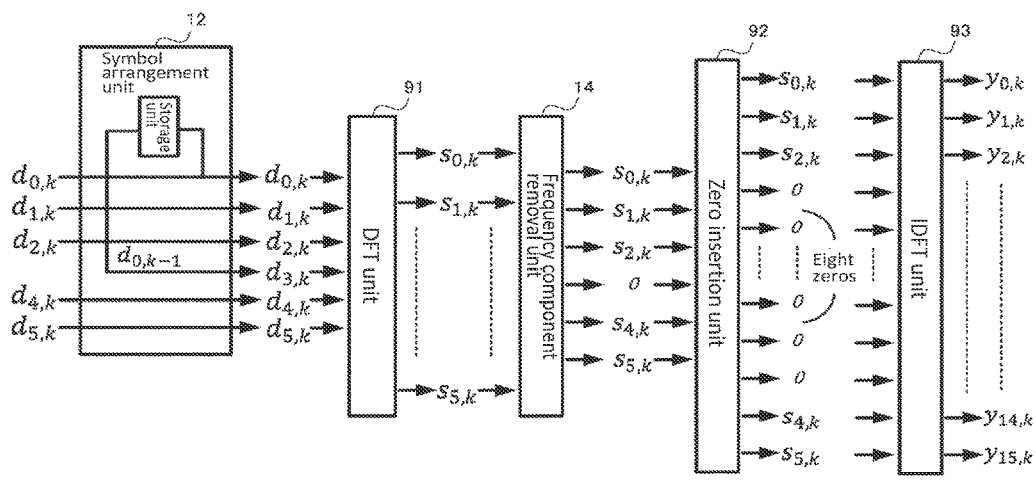
FIG. 15 is a diagram showing relationships between inputs and outputs of the symbol arrangement unit, the DFT unit, the frequency component removal unit, the zero insertion unit, and the IDFT unit according to Embodiment 1.

Next, the transmission signal is explained referring to a specific example. FIG. 15 is a diagram showing relationships between inputs and outputs of the symbol arrangement unit 12, the DFT unit 91, the frequency component removal unit 14, the zero insertion unit 92, and the IDFT unit 93 according to Embodiment 1. Different from FIG. 10, the storage unit 21 is specified in the symbol arrangement unit 12.

Because 4/8=3/6, $\mu$ and $\chi$ are calculated as $\mu=4$ and $=3$ from Formula (1). Here, an insertion position of a duplicate symbol is t=3. A removal position of a symbol removed by the frequency component removal unit 14 is $t_z=3$.

In the embodiment, there are provided a symbol arrangement unit to receive multiple symbols constituting a block, duplicate a first symbol of a block one block previous to the block, and output a block symbol being the block at present with the duplicated duplicate symbol inserted at a first position thereof, a frequency conversion unit to convert the block symbol into a frequency domain signal, a frequency component removal unit to remove one or more frequency components from the frequency domain signal, a time conversion unit to convert, after performing interpolation on the frequency domain signal with the one or more frequency components removed, the interpolated frequency domain signal into a time domain signal, and a cyclic prefix insertion unit to duplicate, in the time domain signal, a signal from a position on a basis of the first position through an end of the time domain as a cyclic prefix, and insert the cyclic prefix at a beginning of the time domain signal; thus, this enables reduction of out-of-band spectra and improvement of frequency utilization efficiency.

In the embodiment, continuity of phases is maintained; however, with a transmission apparatus according to the embodiment, continuity of amplitudes can also be maintained. Maintaining continuity of amplitudes as well as of phases enables further reduction of out-of-band spectra.

Embodiment 2

In the above described Embodiment 1, an embodiment of a transmission apparatus is described; however, in the present embodiment, an embodiment of a reception apparatus is described. The reception apparatus according to the present embodiment receives an SC block signal transmitted from a transmission apparatus explained in Embodiment 1.

Figure 16:
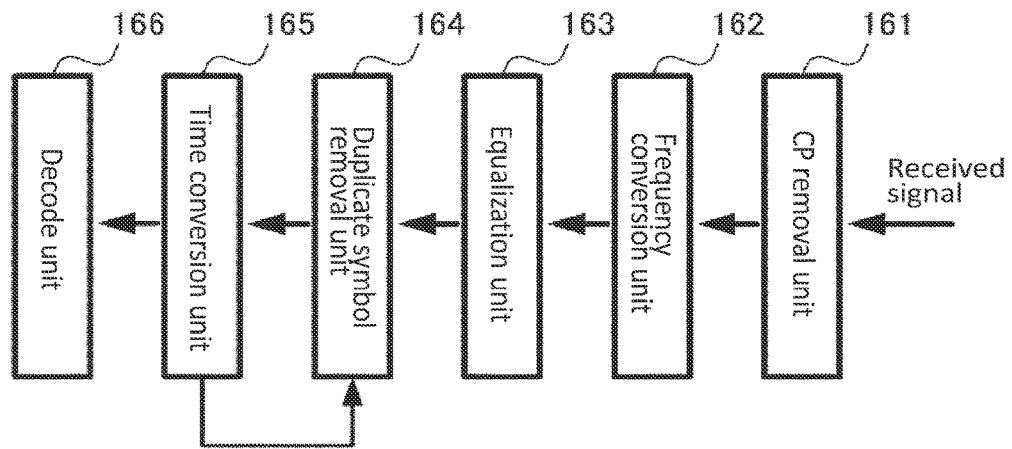
FIG. 16 is a block diagram showing a configuration of a reception apparatus according to Embodiment 2.

FIG. 16 is a block diagram showing a configuration of a reception apparatus 160 according to Embodiment 2. The reception apparatus 160 includes a CP removal unit 161, a frequency conversion unit 162, an equalization unit 163, a duplicate symbol removal unit 164, a time conversion unit 165, and a decode unit 166.

Next, an outline of processing of each unit is explained. The CP removal unit 161 receives a received signal, removes a CP, and outputs the signal with the CP removed to the frequency conversion unit 162. The frequency conversion unit 162 convers the time domain signal into a frequency domain signal, and outputs the frequency domain signal to the equalization unit 163. The equalization unit 163 removes interpolated data from the frequency domain signal, performs equalization processing that corrects distortion generated through transmission channels, and outputs the signal to the duplicate symbol removal unit 164. The duplicate symbol removal unit 164 removes a duplicate symbol, and outputs the signal to the time conversion unit 165. The time conversion unit 165 converts the frequency domain signal into a time domain signal, and outputs the signal to the decode unit 166. The decode unit 166 decodes the signal.

Figure 17:
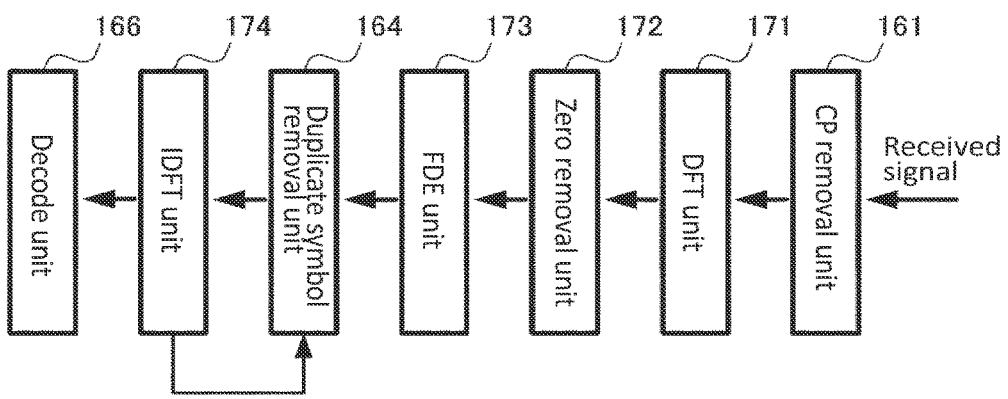
FIG. 17 is a block diagram showing a configuration of a reception apparatus according to Embodiment 2.

Next, a specific example of the reception apparatus 160 is shown. FIG. 17 is a block diagram showing a configuration of a reception apparatus 170 according to Embodiment 2. Different from the reception apparatus 160 in FIG. 16, a DFT unit 171 is used as the frequency conversion unit 162, a zero removal unit 172 and a frequency domain equalization unit (hereinafter, referred to as an FDE (Frequency Domain Equalization) unit) 173 are used as the equalization unit 163, and an IDFT unit 174 is used as the time conversion unit 165. The DFT unit 172 convers a signal with a CP removed into a frequency domain signal using the DFT. The zero removal unit 178 removes zeros inserted for interpolation. The FDE unit 173 performs equalization processing by the FDE. General processing may be used for the FDE. The IDFT unit 174 converts the frequency domain signal into a time domain signal by the IDFT.

Figure 18:
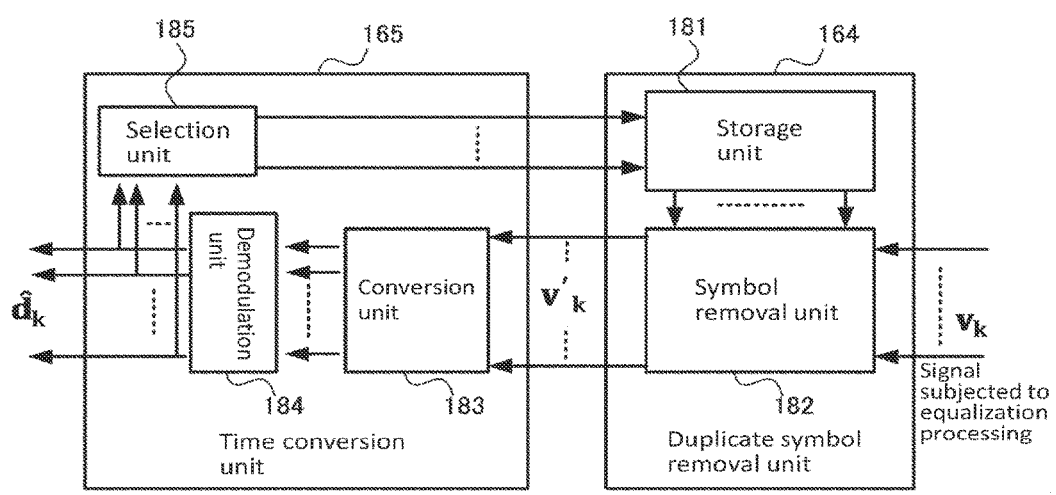
FIG. 18 is a block diagram showing a configuration of a duplicate symbol removal unit and a time conversion unit according to Embodiment 2.

Next, removal of a duplicate symbol is explained. FIG. 18 is a block diagram showing configurations of the duplicate symbol removal unit 164 and the time conversion unit 165 according to Embodiment 2. The duplicate symbol removal unit 164 includes a storage unit 181 and a symbol removal unit 182.

The time conversion unit 165 includes a conversion unit 183, a demodulation unit 184, and a selection unit 185.

A DFT matrix for the number of inputs N and the number of outputs N is defined as Formula 2.

[Expression 2]

$$[w]_{n,l}=e^{-j2\pi n l/N} \qquad \text{(Formula 2)}$$

Here, $0 \leq n \leq N-1$ and $0 \leq l \leq N-1$. Let $W_P$ be a matrix obtained by removing, from the matrix W, rows corresponding to removal positions of frequency components in a transmission apparatus. Assume that one row is removed, $W_P$ is an $(N-1) \times N$ matrix. The removed position in the frequency domain is denoted as $t_z$. Assuming that the i-th row of the matrix W is a $1 \times N$ row vector $q_i^T$, $W_P$ is expressed as Formula 3.

[Expression 3]

$$W_P = \begin{bmatrix} q_0^T \\ q_1^T \\ \vdots \\ q_{t_z-1}^T \\ q_{t_z+1}^T \\ \vdots \\ q_{N-1}^T \end{bmatrix} \qquad \text{(Formula 3)}$$

Using an $(N-1) \times 1$ column vector $w_i$, $W_P$ is expressed as Formula 4.

[Expression 4]

$$W_P = [w_0, w_1, \ldots, w_{N-1}] \qquad \text{(Formula 4)}$$

$$s_k = W_P d_k = \sum_{i=0}^{N-1} w_i d_{i,k}$$

In Formula 4, $s_k$ is an $(N-1) \times 1$ column vector. Assume that a position of a symbol corresponding to the top of a CP is x. Because $d_{x,k}=d_{0,k-1}$ in the transmission apparatus 10, the output from the DFT unit 171 is expressed as Formula 5.

[Expression 5]

$$s_k = W_P d_k = \sum_{i=0}^{N-1} w_i d_{i,k} = \sum_{\substack{i=0 \\ i \neq x}}^{N-1} w_i d_{i,k} + w_x d_{0,k-1} \qquad \text{(Formula 5)}$$

Thus, letting the output from the equalization unit 163 be $v_k$, the output from the duplicate symbol removal unit 164 is expressed as Formula 6. The second term on the right-hand side of Formula 6 indicates a duplicate symbol to be removed.

[Expression 6]

$$v'_k = v_k - w_x \hat{d}_{0,k+1} \qquad \text{(Formula 6)}$$

A value $\hat{d}_{0,k-1}$ is an estimated value used for processing in a previous block, and is outputted from the storage unit 181. Furthermore, a matrix obtained by removing the x-th column from $W_P$ is defined in Formula 7.

[Expression 7]

$$w'_P = [w_0, w_1, \ldots, w_{x-1}, w_{x-l-1}, \ldots, w_{N-1}] \qquad \text{(Formula 7)}$$

The conversion unit 183 converts a frequency domain signal into a time domain signal according to, for example, a ZF (Zero Forcing) theory, and outputs the signal as Formula 8.

[Expression 8]

$$\hat{d}_k = (w'^H_P w'_P)^{-1} w'^H_P v'_k \qquad \text{(Formula 8)}$$

An $(N-1) \times 1$ column vector $\hat{d}_k$ expresses estimated values excluding that of the x-th symbol. The symbol removal unit 181 in the duplicate symbol removal unit 164 removes the duplicated symbol using a demodulation result of the duplicate symbol stored in the storage unit 182. The conversion unit 183 in the time conversion unit 162 receives the signal with the duplicate symbol removed, convers the frequency domain signal into the time domain signal, and outputs the signal to the demodulation unit 184. The demodulation unit 184 demodulates the signal and outputs it to the selection unit 185. The selection unit 185 outputs a symbol at a selected position to the storage unit 181. Note that, the storage unit 181 may store, as duplicated symbols, not only a symbol of the previous block but also demodulated results of blocks before the previous block. In the conversion unit 183, the ZF theory is used for conversion processing; however, other methods may be used for converting a frequency domain signal into a time domain signal.

In the above embodiment, examples for performing SC transmission are explained; however, the invention is not limited to the examples, and is applied to transmission apparatuses and reception apparatuses of various systems including wired ones. In the explanation the DFT processing and the IDFT processing are used; however, not limited to them, the FFT or the IFFT may be used, and a combination of plural techniques may be used. A configuration of the reception apparatus 160 is not limited to apparatus configurations shown in the embodiment.

In the embodiment, there are provided a cyclic prefix removal unit to remove a cyclic prefix from a received signal, a frequency conversion unit to convert the received signal with the cyclic prefix removed into a frequency domain signal, an equalization unit to perform, after removing an interpolated component from the frequency domain signal, equalization processing that corrects frequency characteristics of the frequency domain signal, a duplicate symbol removal unit to remove, from the signal subjected to the equalization processing, a duplicate symbol being a duplication of a symbol of a past block, a time conversion unit to convert the signal with the duplicate symbol removed into a time domain signal, and a decode unit to perform decoding on the basis of the time domain signal; thus, this enables reduction of out-of-band spectra and improvement of frequency utilization efficiency.

REFERENCE NUMERALS

- 10, 90: transmission apparatus
- 11: symbol generation unit
- 12: symbol arrangement unit
- 13, 162: frequency conversion unit
- 14: frequency component removal unit
- 15, 165: time conversion unit
- 16: CP insertion unit
- 17: transmission unit
- 31, 181: storage unit
- 91, 171: DFT unit
- 92: zero insertion unit
- 93: IDFT unit
- 111, 112, 121, 122: graph
- 160: reception apparatus
- 161: CP removal unit
- 163: equalization unit
- 164: duplicate symbol removal unit
- 166: decode unit
- 173: FDE unit
- 182: symbol removal unit
- 183: conversion unit
- 184: demodulation unit
- 185: selection unit

The invention claimed is:

1. A transmission apparatus comprising:
a symbol arranger to receive N−1 symbols constituting a block, duplicate a first symbol of a block one block previous to the block, and output a block symbol being the block at present with the duplicated duplicate symbol inserted at a first position thereof;
a frequency converter to convert the block symbol into a frequency domain signal including N frequency components;
a frequency component remover to remove one or more frequency components from the frequency domain signal, and output up to N−1 frequency components;
a time converter to convert, after performing interpolation on the frequency domain signal with the one or more frequency components removed, the interpolated frequency domain signal into a time domain signal; and
a cyclic prefix inserter to duplicate, in the time domain signal, a signal from a position on a basis of the first position through an end of a time domain as a cyclic prefix, and insert the cyclic prefix at a beginning of the time domain signal.

2. The transmission apparatus according to claim 1, wherein the time converter performs the interpolation such that one or more interpolation points interpolating between a last sample of the time domain signal and a top sample of the time domain signal are added after the last sample.

3. The transmission apparatus according to claim 1, wherein the time converter performs the interpolation by oversampling that increases an amount of data.

4. The transmission apparatus according to claim 2, wherein the time converter performs the interpolation by oversampling that increases an amount of data.

5. A transmission apparatus according to claim 3, further comprising:
a symbol generator to generate a symbol; and
a transmitter to transmit the time domain signal with the cyclic prefix inputted from the cyclic prefix inserter as a single carrier block transmission signal; wherein
the frequency converter converts the block symbol into a frequency domain signal by a discrete Fourier transform; and
the time converter sets zeros to interpolated samples by the oversampling, sets a guard band for protecting interference, and converts the interpolated frequency domain signal into a time domain signal by an inverse discrete Fourier transform.

6. A transmission apparatus according to claim 4, further comprising:
a symbol generator to generate a symbol; and
a transmitter to transmit the time domain signal with the cyclic prefix inputted from the cyclic prefix inserter as a single carrier block transmission signal; wherein
the frequency converter converts the block symbol into a frequency domain signal by a discrete Fourier transform; and
the time converter sets zeros to interpolated samples by the oversampling, sets a guard band for protecting interference, and converts the interpolated frequency domain signal into a time domain signal by an inverse discrete Fourier transform.

7. A transmission method comprising:
receiving N−1 symbols constituting a block, duplicating a first symbol of a block one block previous to the block, and outputting a block symbol being the block at present with the duplicated duplicate symbol inserted at a first position thereof;
converting the block symbol into a frequency domain signal including N frequency components;
removing one or more frequency components from the frequency domain signal, and outputting up to N−1 frequency components;
converting, after performing interpolation on the frequency domain signal with the one or more frequency components removed, the interpolated frequency domain signal into a time domain signal; and duplicating, in the time domain signal, a signal from a position on a basis of the first position through an end of a time domain as a cyclic prefix, and inserting the cyclic prefix at a beginning of the time domain signal.

8. A reception apparatus comprising:

a cyclic prefix remover to remove a cyclic prefix from a received signal;

a frequency converter to convert the received signal with the cyclic prefix removed into a frequency domain signal;

an equalizer to perform, after removing an interpolated component from the frequency domain signal, equalization processing that corrects frequency characteristics of the frequency domain signal;

a duplicate symbol remover to remove, from the signal subjected to the equalization processing, a duplicate symbol being a duplication of a symbol of a past block;

a time converter to convert the signal with the duplicate symbol removed into a time domain signal; and a decoder to perform decoding on a basis of the time domain signal.

9. The reception apparatus according to claim 8, wherein the time converter demodulates the time domain signal, and outputs, from the demodulated symbols, a symbol at a first position used as the duplicate symbol to the duplicate symbol remover.

10. The reception apparatus according to claim 8, wherein the frequency converter converts the received signal with the cyclic prefix removed into a frequency domain signal by a discrete Fourier transform; and the time converter converts the frequency domain signal into a time domain signal by an inverse discrete Fourier transform.

11. The reception apparatus according to claim 9, wherein the frequency converter converts the received signal with the cyclic prefix removed into a frequency domain signal by a discrete Fourier transform; and the time converter converts the frequency domain signal into a time domain signal by an inverse discrete Fourier transform.

12. A reception method comprising:

removing a cyclic prefix from a received signal;

converting the received signal with the cyclic prefix removed into a frequency domain signal;

performing, after removing an interpolated component from the frequency domain signal, equalization processing that corrects frequency characteristics of the frequency domain signal;

removing, from the signal subjected to the equalization processing, a duplicate symbol being a duplication of a symbol of a past block;

converting the signal with the duplicate symbol removed into a time domain signal; and decoding on a basis of the time domain signal.

* * * * *